(12) United States Patent
Kobayashi et al.

(10) Patent No.: US 8,329,086 B2
(45) Date of Patent: *Dec. 11, 2012

(54) METHOD OF MANUFACTURING LIQUID EJECTING HEAD

(75) Inventors: Hiroyuki Kobayashi, Shiojiri (JP);
Katsuhiro Okubo, Azumino (JP);
Kazuhide Nakamura, Asahi-mura (JP);
Nobuyoshi Uji, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 200 days.

This patent is subject to a terminal disclaimer.

(21) Appl. No.: 12/853,171

(22) Filed: Aug. 9, 2010

(65) Prior Publication Data

US 2011/0031641 A1    Feb. 10, 2011

(30) Foreign Application Priority Data

Aug. 10, 2009   (JP) .................................. 2009-185500

(51) Int. Cl.
*B29C 45/14*   (2006.01)
(52) U.S. Cl. ........................................ 264/263; 264/101
(58) Field of Classification Search .................. 264/101, 264/263
See application file for complete search history.

(56) References Cited

U.S. PATENT DOCUMENTS

| | | | |
|---|---|---|---|
| 6,019,465 A | 2/2000 | Shinada et al. | |
| 6,190,009 B1 | 2/2001 | Kitahara | |
| 6,457,821 B1 | 10/2002 | Liu et al. | |
| 6,634,742 B2 | 10/2003 | Owaki et al. | |
| 6,814,435 B1 | 11/2004 | Shimada et al. | |
| 7,878,638 B2 | 2/2011 | Akase et al. | |
| 7,958,634 B2 * | 6/2011 | Kobayashi et al. | 29/890.1 |
| 2004/0257414 A1 | 12/2004 | Anderson, Jr. et al. | |
| 2009/0122125 A1 | 5/2009 | Owaki et al. | |

(Continued)

FOREIGN PATENT DOCUMENTS

JP    2000-211130 A    8/2000

(Continued)

*Primary Examiner* — Christina Johnson
*Assistant Examiner* — Saeed Huda
(74) *Attorney, Agent, or Firm* — Kilpatrick Townsend & Stockton LLP

(57) ABSTRACT

There is provided a method of manufacturing a liquid ejecting head which includes a head main body having nozzles ejecting a liquid supplied via a liquid supply passage, a first supply member having a first liquid supply passage forming a part of the liquid supply passage, a second supply member disposed on a downstream side of the first supply member and having a second liquid supply passage communicating with the first liquid supply passage and forming a part of the liquid supply passage, a filter disposed between the first and second supply members so as to cross the liquid supply passage, and an integrally molded member fixing the first and second supply members by a resin in a state where the filter is nipped between the first and second supply members. The method includes: forming a supporting protrusion protruding toward the filter and supporting the filter on an inner wall surface of at least one of the first and second supply members; and forming the integrally molded member in the state where the filter is nipped between the first and second supply members and a pressure difference is caused between the first and second supply members on both sides of the filter so that a pressure is lower on the side of the supporting protrusion.

4 Claims, 15 Drawing Sheets

U.S. PATENT DOCUMENTS

| | | |
|---|---|---|
| 2009/0207222 A1 | 8/2009 | Kamikura |
| 2009/0212460 A1 | 8/2009 | Kamikura |
| 2009/0213199 A1 | 8/2009 | Owaki et al. |
| 2009/0225142 A1 | 9/2009 | Kamikura |
| 2010/0071211 A1* | 3/2010 | Kobayashi et al. .......... 29/890.1 |
| 2010/0077613 A1* | 4/2010 | Kamikura et al. .......... 29/890.1 |
| 2010/0214379 A1* | 8/2010 | Owaki et al. .................... 347/85 |
| 2010/0245474 A1* | 9/2010 | Okubo ............................ 347/44 |
| 2011/0030216 A1* | 2/2011 | Kobayashi et al. .......... 29/890.1 |

FOREIGN PATENT DOCUMENTS

| | | |
|---|---|---|
| JP | 2009-113250 A | 5/2009 |
| JP | 2009-132135 A | 6/2009 |
| JP | 2009-190278 A | 8/2009 |
| JP | 2009-196224 A | 9/2009 |
| JP | 2009-208450 A | 9/2009 |
| JP | 2009-220567 A | 10/2009 |
| JP | 2009-255431 A | 11/2009 |

* cited by examiner

METHOD OF MANUFACTURING LIQUID EJECTING HEAD

The entire disclosure of Japanese Patent Application No: 2009-185500, filed Aug. 10, 2009 are expressly incorporated by reference herein.

BACKGROUND

1. Technical Field

The present invention relates to a method of manufacturing a liquid ejecting head capable of ejecting a liquid from nozzle openings, and more particularly, to a method of manufacturing a method of an ink jet printing head capable of ejecting ink as a liquid.

2. Related Art

In an ink jet printing head, which is a representative example of a liquid ejecting head, ink is generally supplied from an ink cartridge, which is a liquid storing unit filled with the ink, to a head main body via an ink supply needle detachably inserted into the ink cartridge and an ink passage (liquid supply passage) formed in a supply member such as a cartridge case holding the ink cartridge. In the head main body to which the ink is supplied, pressure generating mechanisms such as piezoelectric elements are disposed. Therefore, by driving the pressure generating mechanisms, the ink is ejected from nozzles.

When bubbles contained in the ink stored in the ink cartridge or bubbles mixed in the ink upon mounting or detaching the ink cartridge are supplied to the head main body of the ink jet printing head, a problem may arise in that ejection failure such as dot omission occurs due to the bubbles. In order to solve this problem, there was suggested an ink jet printing head in which a filter is disposed between an ink supply needle inserted into an ink cartridge and a supply member to remove the bubbles, dust, or the like in the ink (for example, see JP-A-2000-211130).

There was also suggested a liquid ejecting head in which an ink supply needle and a supply member are integrally formed by an integrally molded member (outer member) (for example, see JP-A-2009-132135).

However, while the filter is interposed by the ink supply needle, a problem may arise in that the filter is deviated from a predetermined position and the supply member or wrinkling occurs in the filter and thus the filter itself is deformed. For this reason, since position deviation of the filter or the deformation of the filter occurs, the bubbles or the like in the ink may not be filtered by the filter and may reach the nozzles. Therefore, a problem may also arise in that dot omission occurs since ink droplets are not ejected or ejection failure occurs since an ejection direction is deviated. In particular, when the integrally molded member is formed, as in JP-A-2009-132135, there is a high possibility that the position deviation of the filter or the deformation of the filter occurs due to stress caused by pressure upon filling a resin or contraction upon hardening the resin.

These problems occur not only in a method of manufacturing the ink jet printing head but also in a method of manufacturing a liquid ejecting head capable of ejecting a liquid other than ink.

SUMMARY

An advantage of some aspects of the invention is that it provides a method of manufacturing a liquid ejecting head capable of suppressing position deviation or deformation of a filter to prevent ejection failure.

According to an aspect of the invention, there is provided a method of manufacturing a liquid ejecting head which includes a head main body having nozzles ejecting a liquid supplied via a liquid supply passage, a first supply member having a first liquid supply passage forming a part of the liquid supply passage, a second supply member disposed on a downstream side of the first supply member and having a second liquid supply passage communicating with the first liquid supply passage and forming a part of the liquid supply passage, a filter disposed between the first and second supply members so as to cross the liquid supply passage, and an integrally molded member fixing the first and second supply members by a resin in a state where the filter is nipped between the first and second supply members. The method includes: forming a supporting protrusion protruding toward the filter and supporting the filter on an inner wall surface of at least one of the first and second supply members; and forming the integrally molded member in the state where the filter is nipped between the first and second supply members and a pressure difference is caused between the first and second liquid supply passages on both sides of the filter so that a pressure is lower on the side of the supporting protrusion.

With such a configuration, the filter can be adsorbed and retained to the first or second supply member by the pressure difference, when the integrally molded member is formed. Therefore, the filter can be prevented from being deviated at its position or deformed due to the pressure when the integrally molded member is formed.

In the method according to the aspect of the invention, the pressure difference may be caused between the first and second supply members by suction from the liquid supply passage on one side of the first and second supply members in which the supporting protrusion is formed or blowing from the liquid supply passage on the other side thereof. With such a configuration, the pressure difference can be readily caused on both sides of the filter.

In the method according to the aspect of the invention, a front end surface of the supporting protrusion supporting the filter may be rectangular, and a plurality of the supporting protrusions may be formed in at least one of the first and second supply members so that a long side of the front end surface of each supporting protrusion has an angle of 180 degrees or less. With such a configuration, since the filter can be reliably supported by the supporting protrusions, the filter can be further prevented from being deformed.

In the method according to the aspect of the invention, the supporting protrusion may be formed in the first supply member. With such a configuration, the filter in the first supply member on the upstream side can be reliably prevented from being deformed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described in detail.

First Embodiment

Figure 1:
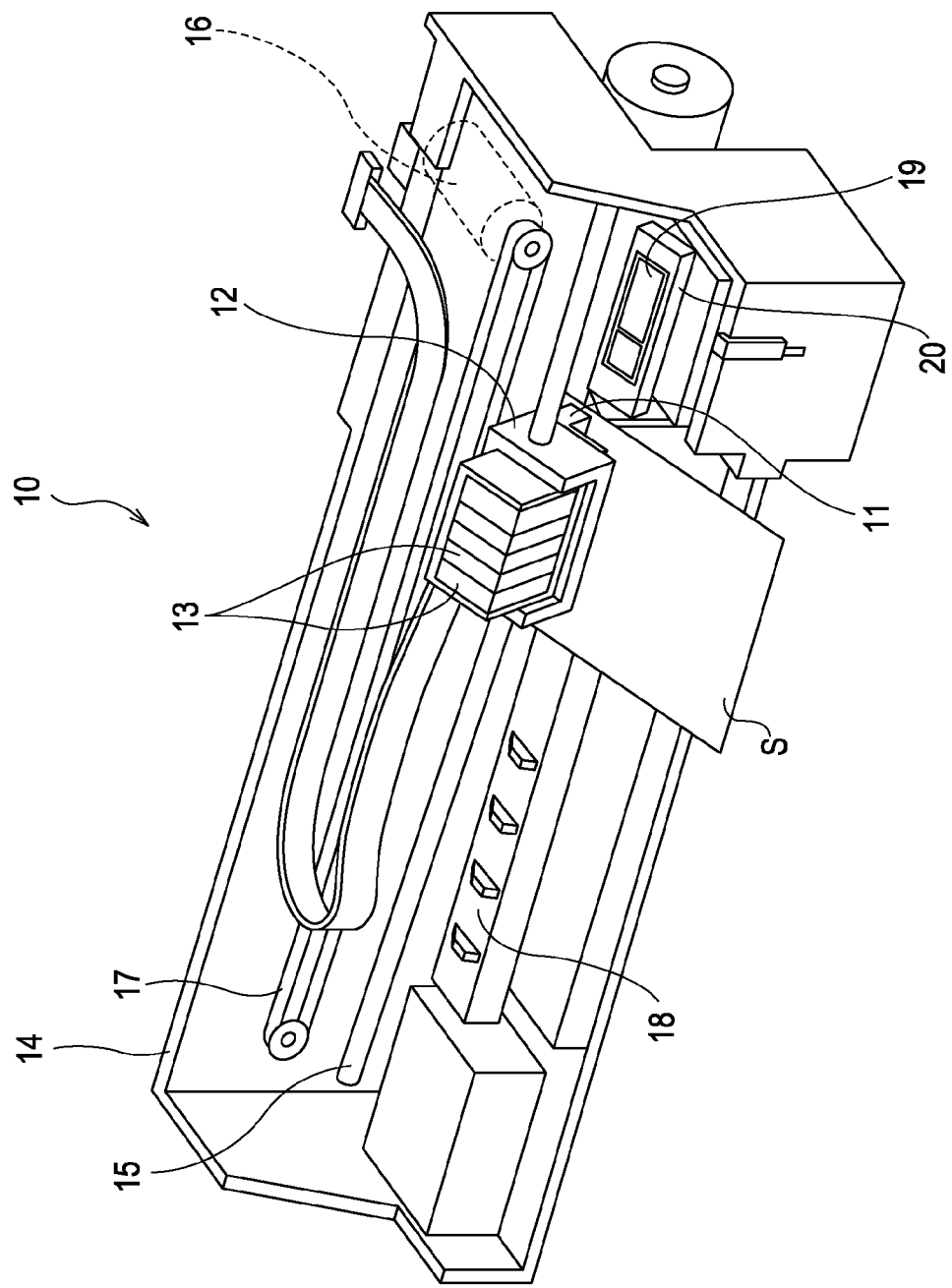
FIG. 1 is a schematic perspective view illustrating a printing apparatus according to a first embodiment of the invention.

FIG. 1 is a schematic perspective view illustrating an ink jet printing apparatus, which is an example of a liquid ejecting apparatus, according to a first embodiment of the invention.

As shown in FIG. 1, an ink jet printing head (hereinafter, referred to as a printing head) 11, which is an example of a liquid ejecting head included in an ink jet printing apparatus 10 and ejecting ink, is fixed to a carriage 12. A plurality of ink cartridges 13, which is liquid storing units storing a plurality of different ink of black (B), light black (LB), cyan (C), magenta (M), and yellow (Y), respectively, is detachably fixed to the printing head 11.

The carriage 12 mounted with the printing head 11 is movably disposed in a shaft direction in a carriage shaft 15 mounted in an apparatus main body 14. A driving force of a driving motor 16 is delivered to the carriage 12 via a plurality of toothed wheels (not shown) and a timing belt 17, so that the carriage 12 is moved along a carriage shaft 15. In the apparatus main body 14, on the other hand, a platen 18 is disposed along the carriage shaft 15 so that a printing medium S such as a paper sheet fed by a feeding mechanism (not shown) is transported on the platen 18.

A capping device 20 which has a cap member 19 nipping a nozzle formation surface of the printing head 11 is disposed near the position corresponding to a home position of the carriage 12, that is, near one end of the carriage shaft 15. The nozzle formation surface, in which a nozzle opening is formed, is sealed by the cap member 19 to prevent the ink from being dry. The cap member 19 functions as an ink receiver in a cleaning operation.

Figure 2:
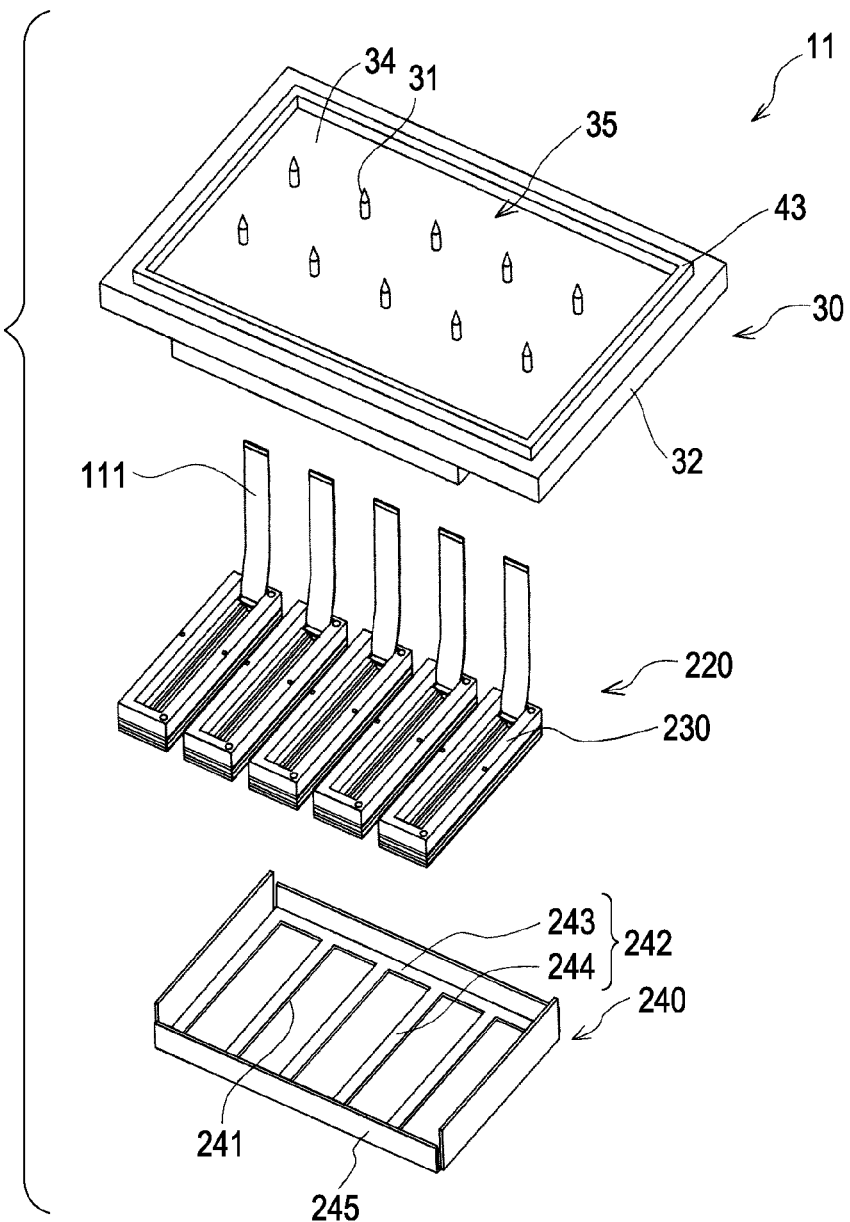
FIG. 2 is an exploded perspective view illustrating a printing head according to the first embodiment of the invention.

Hereinafter, the ink jet printing head 11, which is an example of the liquid ejecting head according to the embodiment, will be described. FIG. 2 is an exploded perspective view illustrating the ink jet printing head according to the first embodiment of the invention.

As shown in FIG. 2, the printing head 11 includes a supply member 30 such as a cartridge case to which the ink cartridges 13 serving as the liquid storing units are fixed, head main bodies 220 fixed to an opposite surface of the ink cartridges 13 of the supply member 30, and a cover head 240 disposed on the liquid ejection surfaces of the head main bodies 220.

Figure 3:
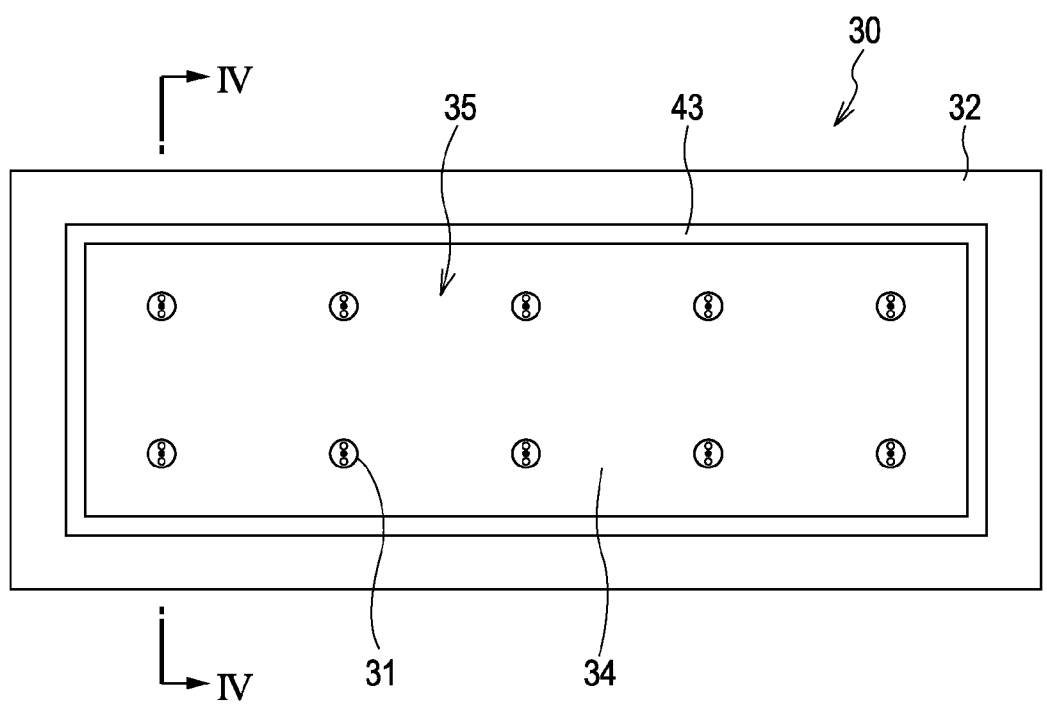
FIG. 3 is a diagram illustrating the upper surface of a supply member according to the first embodiment of the invention.
Figure 4:
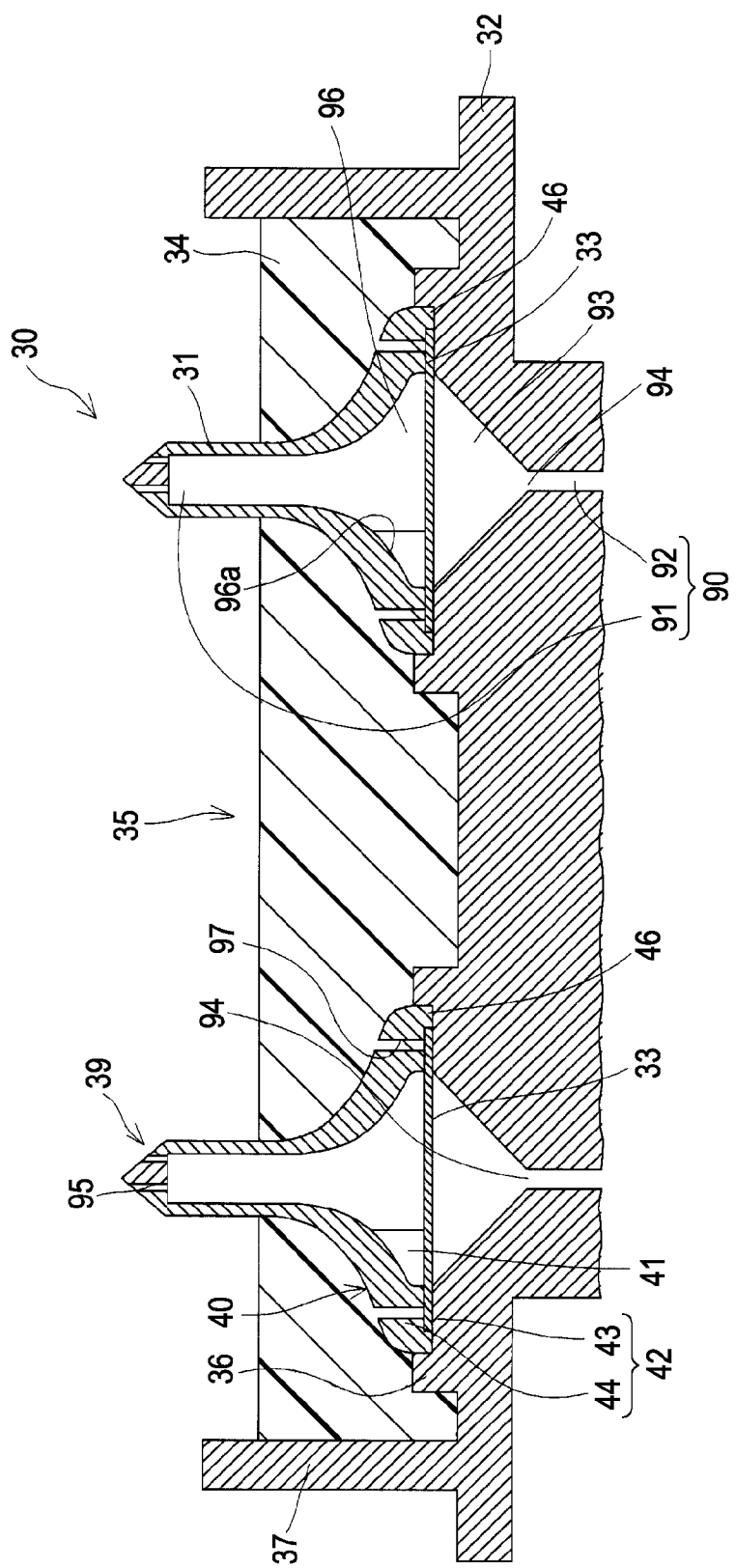
FIG. 4 is a sectional view illustrating the supply member according to the first embodiment of the invention.
Figure 5:
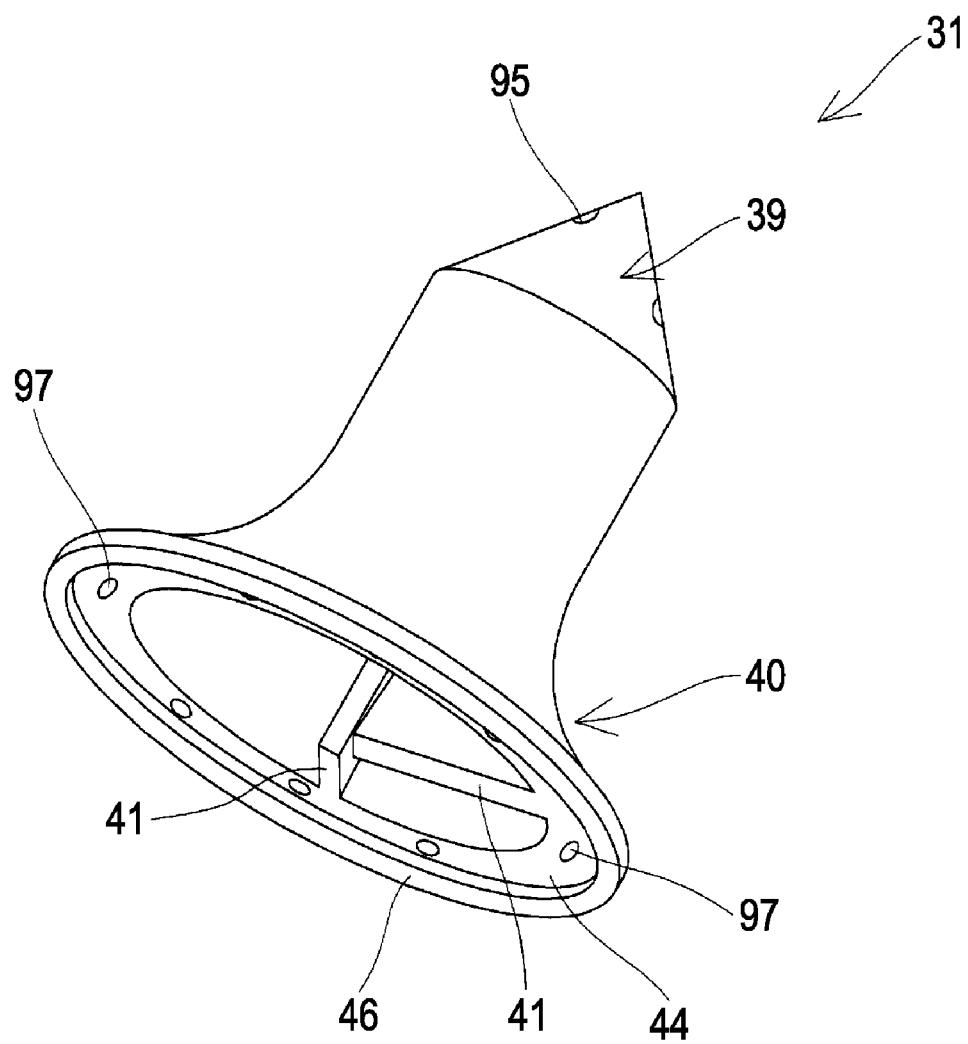
FIG. 5 is a perspective view illustrating a supply needle according to the first embodiment of the invention.

First, the supply member 30 will be described in detail. FIG. 3 is a diagram illustrating the upper surface of the supply member. FIG. 4 is a sectional view taken along the line IV-IV of FIG. 3. FIG. 5 is a perspective view illustrating a supply needle.

As shown in FIGS. 3 and 4, the supply member 30 includes: supply needles 31, which are a first supply member; a supply member main body 32, which is a second supply member with one surface in which the plurality of supply needles 31 are disposed; a filter 33 nipped between the supply needles 31 and the supply member main body 32; and an integrally molded member 34 in which the supply needles 31, the supply member main body 32, and the filter 33 are integrally formed.

The supply member 30 includes a supply member mounting member 35 with one surface on which the above-described ink cartridges 13 are mounted. Of course, the ink cartridges 13 may not be mounted directly on the supply member mounting unit 35, but the ink may be supplied from the liquid storing units storing the ink to the supply member mounting unit 35 via a tube or the like.

The head main bodies 220 are joined to the other surface of the supply member 30 on the opposite side of the supply member mounting unit 35. In the supply member 30, liquid supply passages 90 are disposed to supply the ink from the ink cartridges 13 disposed on one surface of the supply member 30 to the head main bodies 220 disposed on the other surface of the supply member 30. A filter 33 is disposed inside the supply member 30 so as to cross the liquid supply passage 90.

Hereinafter, members included in the supply member 30 will be described in detail.

The supply member main body 32 has a second liquid supply passage 92 which is disposed on the downstream side of the filter 33 described below, of which one end is opened to the surface (the one surface of the supply member main body 32) in which the supply needles 31 of the supply member main body 32 are disposed, and of which the other end is opened to the head main body 220. The second liquid supply passage 92 forms a part of the liquid supply passage 90. The plurality of head main bodies 220, that is, five head main bodies 220 in this embodiment are disposed in the supply member 30. Two liquid supply passages 90 are disposed in one head main body 220. The ink is introduced independently from one ink cartridge 13 to the two liquid supply passages 90. A second filter chamber 93 with an inner diameter narrower from the side of the supply needle 31 to the downstream side is formed in the supply member mounting unit 35 of the second liquid supply passage 92. In this way, the second liquid supply passage 92 according to this embodiment includes the second filter chamber 93 and a supply passage having substantially the same inner diameter as that of an ink supply port and communicating with the ink supply port 94, which is an opening of the second filter chamber 93 on the side of the head main body 220.

Protruding bank portions 36 are formed on the surface of the supply member main body 32. The bank portion 36 surrounds the outer circumference (the outer circumference of a hem-like portion 40) of the supply needle 31 and thus positions the supply needle 31. Moreover, a protruding wall portion 37 is formed on the surface to which the supply needles 31 of the supply member main body 32 are fixed. The integrally molded member 34 formed in a manufacturing process described below is disposed inside the wall portion 37.

The supply needle 31 is fixed to one surface of the supply member main body 32 and has the hem-like portion 40 of which a width expands toward the bottom surface from a front end portion 39. The supply needle 31 includes a first liquid supply passage 91 communicating with an ink introducing port 95 formed in the front end portion 39 and forming a part of the liquid supply passage 90. The first liquid supply passage 91 communicates with the second liquid supply passage 92 of the supply member main body 32 via the filter 33. That is, the liquid supply passage 90 of the supply member 30 includes the first liquid supply passage 91 of the supply needle 31 and the second liquid supply passage 92 of the supply member main body 32. The first liquid supply passage 91 has a first filter chamber 96 as a large-width portion which is a space with an inner diameter horizontally expanded toward the second liquid supply passage 92.

As shown in FIG. 5, first supporting protrusions 41 protruding toward the filter 33 are formed in the first liquid supply passage 91 of the supply needle 31. The first supporting protrusions 41 are formed in a protruding manner toward the filter 33 on the inner wall surface 96a of the supply needle 31 facing the filter 33 and partitioning the first filter chamber 96. In other words, the first supporting protrusions 41 protrude from the circumference to the middle portion of the filter 33, and the end surfaces of the first supporting protrusions 41 on the side of the filter 33 are flush with the end surface of the hem-like portion 40. Therefore, the first supporting protrusion 41 supports the filter 33 by the same end surface as the end surface of the hem-like portion 40.

The front end surface of the first supporting protrusion 41 supporting the filter 33 is rectangular. It is desirable that the long sides of the two first supporting protrusions 41 are disposed at 180 degrees or less. In this way, by disposing the long sides of the front end surfaces of the two first supporting protrusions 41 at 180 degrees or less, it is possible to reliably suppress the filter 33 from being deformed by the first supporting protrusions 41. In this embodiment, as the first supporting protrusions 41, the two first protrusions 41 protruding toward the middle portion of the filter 33 (the first liquid supply passage 91) are disposed at about 90 degrees. The end portions of the two first supporting protrusions 41 are disposed with a gap therebetween so as not to come into contact with each other at the middle portion of the first liquid supply passage 91. With such a configuration, it is possible to prevent flow of the ink in the first liquid supply passage 91 from being disturbed by the two first supporting protrusions 41.

A plurality of through-holes 97 formed through the hem-like portion 40 of the supply needle 31 are disposed at a predetermined interval in a circumferential direction. In this embodiment, eight through-holes 97 are disposed in the hem-like portion 40.

As described in detail below, the through-holes 97 formed in the supply needle 31 function as parts of suction holes sucking the filter 33 upon manufacturing the printing head 11 and are buried in a part of the integrally molded member 34 described below after the printing head 11 is manufactured.

The supply needle 31 and the supply member main body 32 have nip regions 42 which are regions nipping the filter 33. In this embodiment, the nip region 42 is a region where a filter nip portion 43, which is an opening circumferential portion of the second liquid supply passage 92 in one surface of the supply member main body 32, and a needle-side filter nip portion 44, which is an opening circumferential portion on the side of the supply member main body 32 of the supply needle 31, face each other.

A filter guide 46 protruding toward the supply member main body 32 is disposed outside the needle-side filter nip portion 44 of the supply needle 31. The filter guide 46 is disposed in the periphery of the needle-side filter nip portion 44. Therefore, when the filter 33 is adsorbed to the supply needle 31 in a suction manner, the filter guide 46 positions the filter 33 to the supply needle 31. By allowing the filter guide 46 to protrude less than the thickness of the filter 33, the filter 33 is reliably nipped between the filter nip portion 43 and the needle-side filter nip portion 44.

The filter 33 is nipped between the supply needle 31 and the supply member main body 32 so as to cross the liquid supply passage 90, that is, between the filter nip portion 43 and the needle-side filter nip portion 44.

The filter 33 has a sheet shape which is finely interwoven with metal and has a plurality of fine holes. The filter 33 is larger than the opening shape of the second liquid supply passage 92 and smaller than the filter guide 46. The filter 33 is not limited to the shape finely interwoven with metal. For example, a sheet of metal plate, resin plate, or nonwoven fabric with a plurality of through-holes may be used. Bubbles or foreign materials in the ink flowing in the liquid supply passage 90 are removed by the filter 33.

The integrally molded member 34 joins the supply needles 31 and the supply member main body 32 to each other nipping the filter 33. The "joining" means that the integrally molded member 34 is formed so as to come into contact with both the supply needles 31 and the supply member main body 32 and the supply needles 31 and the supply member main body 32 are joined to each other to integrally form the supply needles 31, the supply member main body 32, and the filters 33.

The integrally molded member 34 is disposed outside the nip regions 42 in the circumferential direction of the supply needle 31. In this embodiment, the integrally molded member 34 is disposed outside the nip regions 42, that is, is continuously formed to cover the hem-like portions 40 from the bank portions 36 across the entire inside of the wall portion 37. When the integrally molded member 34 covers the outside of the nip regions 42, it is possible to prevent the ink from flowing from the nip regions 42. In this embodiment, the integrally molded member 34 is formed continuously and commonly in all of the supply needles 31. However, the invention is not limited thereto. For example, the integrally molded member 34 may be formed in every supply needle 31 or may be independently formed in a supply needle group 31 formed by two or more supply needles 31.

When the filters are fixed to the supply member main body by thermal welding and the supply needles are fixed to the supply member main body by ultrasonic wave welding, it is necessary to provide regions where the filters are welded to the supply member main body and it is necessary to provide regions where the supply needles are welded to the outside of the regions where the filters are welded. For this reason, the size of the supply member main body may be increased and thus the size of the supply member 30 may be increased. In this embodiment of the invention, however, since the supply member main body 32 and the supply needles 31 are fixed by the integrally molded member 34, the regions for the welding are not necessary. Therefore, since the interval of the supply needles 31 adjacent to each other can be shortened, the printing head 11 can be miniaturized. In this embodiment of the invention, since the printing head 11 can be miniaturized, it is not necessary to decrease the area of the filter and thus decrease the size of the head. In addition, when the area of the filter is excessively decreased, dynamic pressure is increased. Therefore, a driving voltage has to be increased to drive the pressure generating unit such as a piezoelectric element or a heating element. In this embodiment of the invention, however, since it is not necessary to decrease the area of the filer and miniaturize the printing head, the dynamic pressure is not increased and it is not necessary to increase the driving voltage.

When the supply needles and the supply member main body are fixed by welding, a gap may occur. Therefore, the ink may leak from the gap. In this embodiment of the invention, since the supply needles 31 and the supply member main body 32 are fixed by the integrally molded member 34, there is no gap therebetween and thus it is possible to prevent the ink from leaking from the gap. Even when a gap occurs, the gap is covered with the integrally molded member 34. Therefore, it is possible to reliably prevent the ink from leaking.

Figure 6:
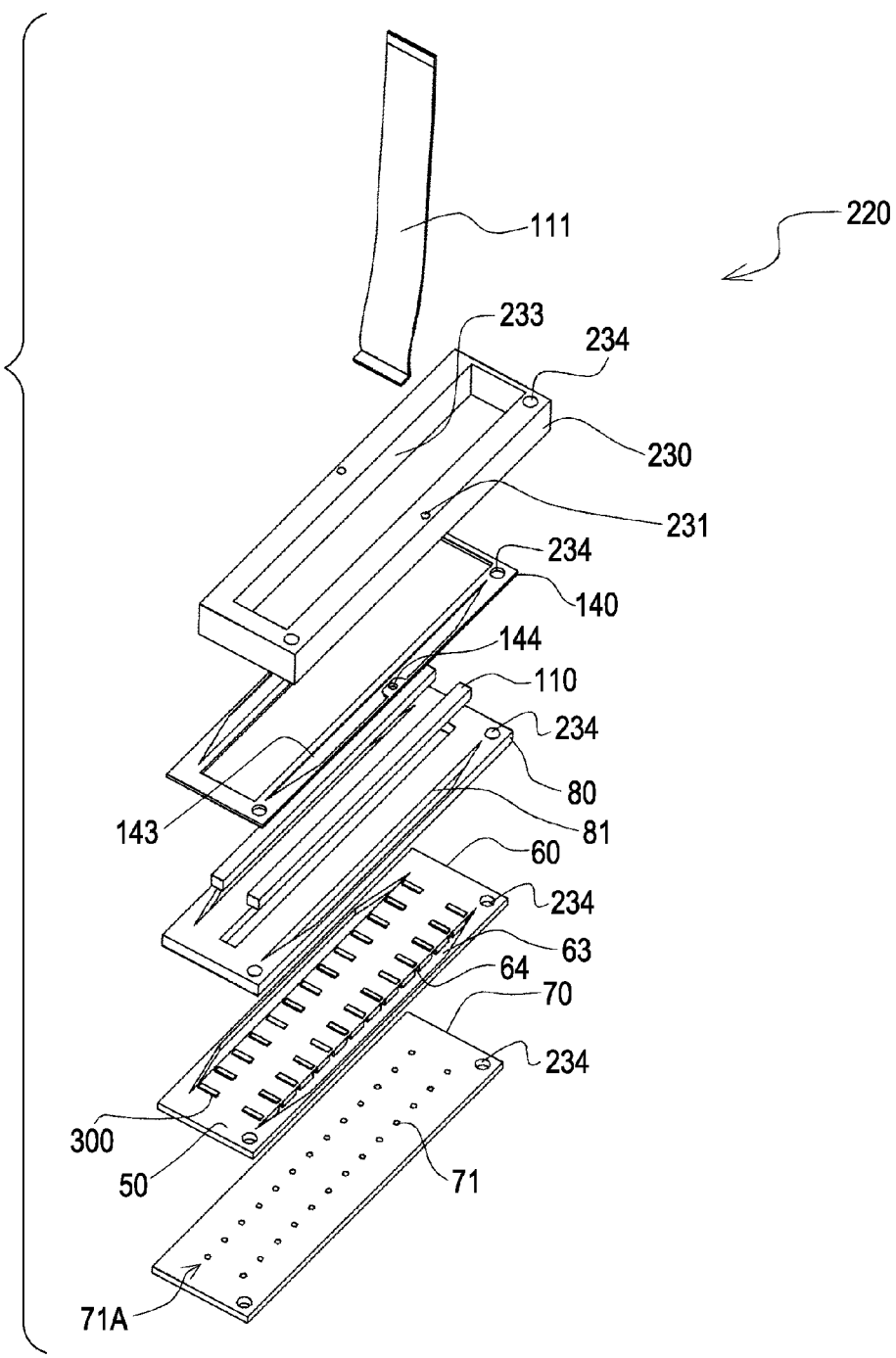
FIG. 6 is an exploded perspective view illustrating a head main body according to the first embodiment of the invention.
Figure 7:
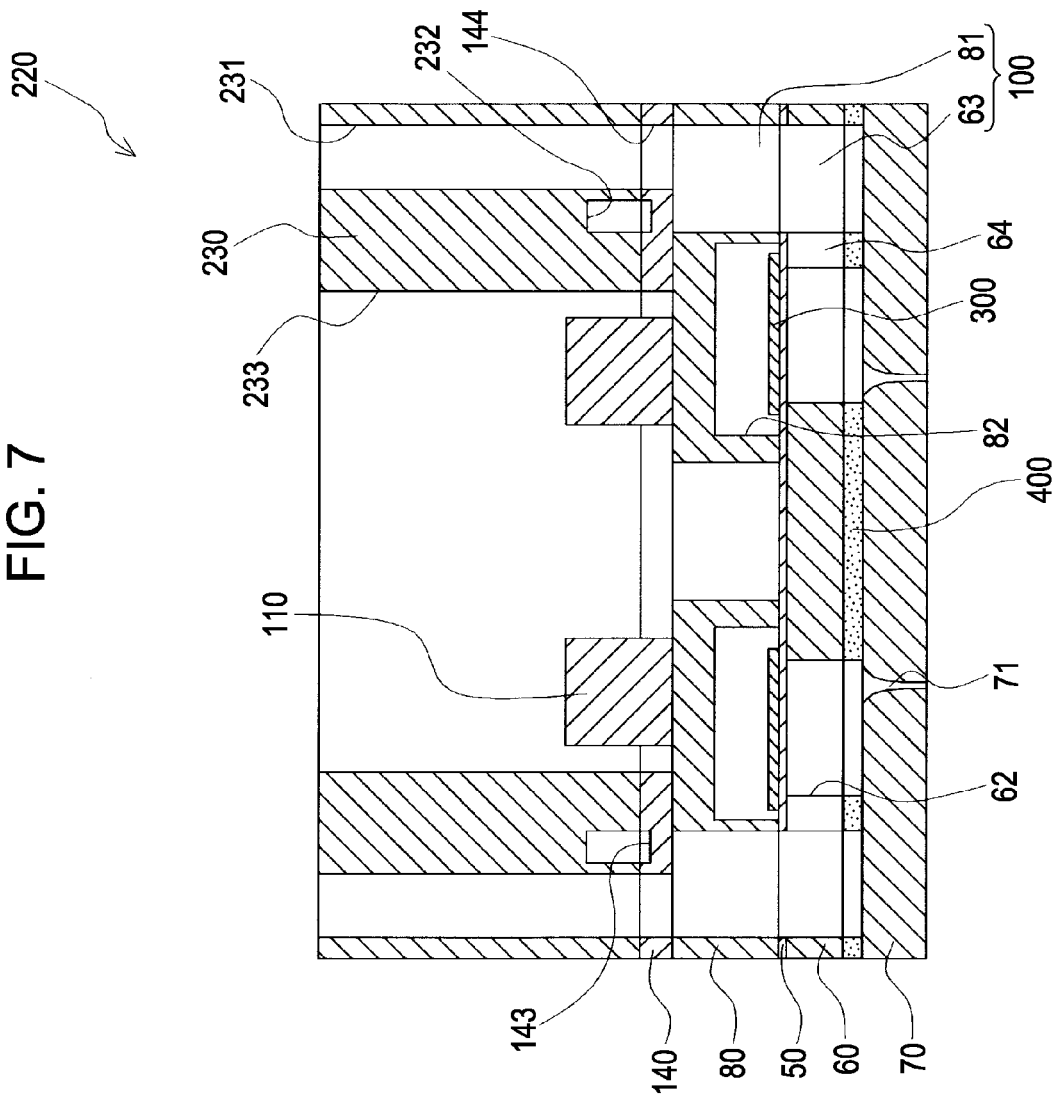
FIG. 7 is a sectional view illustrating the head main body according to the first embodiment of the invention.

The head main body 220 is disposed on the opposite side of the ink cartridge 13 of the liquid supply 90 of the supply member 30. Hereinafter, the head main body 220 will be described. FIG. 6 is an exploded perspective view illustrating the head main body. FIG. 7 is a sectional view illustrating the head main body.

As illustrated, a passage forming substrate 60 included in the head main body 220 is formed of a silicon single-crystal substrate. An elastic film 50 formed of silicon dioxide is formed on one surface of the passage forming substrate 60. In the passage forming substrate 60, two rows of pressure generating chambers 62 partitioned by a plurality of partition walls are formed in parallel in the width direction by anisotropic etching from the other surface of the passage forming substrate 60. A communication portion 63 communicating with a manifold portion 81 disposed in a protective substrate 80, which is described below, and forming a manifold 100 serving as a common ink chamber of the pressure generating chambers 62 is formed outside each row of the pressure generating chambers 62 in the longitudinal direction. The communication portion 63 communicates with one ends of the pressure generating chambers 62 in the longitudinal direction via a supply passage 64. That is, in this embodiment, the pressure generating chambers 62, the communication portions 63, and the supply passage 64 are disposed as liquid passages in the passage forming substrate 60.

A nozzle plate 70 having nozzle openings 71 is adhered to the opening surface of the passage forming substrate 60 via an adhesive 400. Specifically, the plurality of nozzle plates 70 are disposed to correspond to the plurality of head main bodies 220. The nozzle plate 70 has an area slightly broader than that of an exposure opening 241 of a cover head 240, which is described below, and is fixed in a region overlapping with the cover head 240 by an adhesive or the like. The nozzle openings 71 of the nozzle plate 70 are punched at the positions communicating with the opposite side of the supply passages 64 of each pressure generating chamber 62. In this embodiment, two rows of the pressure generating chambers 62 are arranged in the passage forming substrate 60, and thus two nozzle rows 71A in which the nozzle openings 71 are arranged in parallel are formed in one head main body 220. In this embodiment, a surface to which the nozzle openings 71 of the nozzle plate 70 are opened is a liquid ejection surface. As the nozzle plate 70, for example, a silicon single-crystal substrate or a metal substrate such as stainless steel (SUS) may be used.

On the other hand, on the opposite side of the opening surface of the passage forming substrate 60, a piezoelectric element 300, in which a lower electrode layer formed of metal, a piezoelectric layer formed of a piezoelectric material such as lead zirconate titanate (PZT), and an upper electrode layer formed of metal are sequentially laminated, is formed on the elastic film 50.

The protective substrate 80 having the manifold portion 81 forming at least a part of the manifold 100 is joined to the passage forming substrate 60 in which the piezoelectric element 300 is formed. In this embodiment, the manifold portions 81 penetrate the protective substrate 80 in the thickness direction so as to be formed in the width direction of the pressure generating chambers 62. As described above, the manifold portion 81 communicates with the communication portion 63 of the passage forming substrate 60 and forms the manifold 100 serving as the common ink chamber of the pressure generating chambers 62.

A piezoelectric element retaining portion 82 having a space to the degree that the motion of the piezoelectric element 300 is not disturbed is disposed in the region of the protective substrate 80 facing the piezoelectric element 300.

A driving circuit 110 such as a semiconductor integrated circuit (IC) driving the piezoelectric element 300 is disposed on the protective substrate 80. Each terminal of the driving circuit 110 is connected to a drawn wire drawn from an individual electrode of the piezoelectric element 300 via a bonding wire (not shown). Each terminal of the driving circuit 110 is connected to the outside via an external wiring 111 such as a flexible printed circuit substrate (FPC) and receives various signals such a print signal via the external wiring 111 from the outside.

A compliance substrate 140 is joined to the protective substrate 80. An ink introducing port 144 supplying the ink to the manifold 100 is formed through the compliance substrate 140 in the thickness direction in the region facing the manifold 100. A flexible portion 143 which is thin in the thickness direction is formed in the region facing the manifold 100 of the compliance substrate 140 other than the region of the ink introducing port 144. The manifold 100 is sealed by the flexible portion 143. Compliance is given in the manifold 100 by the flexible portion 143.

A head case 230 is fixed to the compliance substrate 140.

The head case 230 has ink supply communication passages 231 communicating with the ink introducing ports 144 and communicating with the liquid supply passages 90 of the supply member 30 to supply the ink from the supply member 30 to the ink introducing ports 144. In the head case 230, a groove 232 is formed in the region facing the flexible portion 143 of the compliance substrate 140 so that flexible portion 143 can be bent and deformed appropriately. In the head case 230, a driving circuit retaining portion 233 formed through in the thickness direction is formed in the region facing the driving circuit 110 disposed on the protective substrate 80. Therefore, the external wiring 111 is inserted through the driving circuit retaining portion 233 and is connected to the driving circuit 110.

Pin insertion holes 234 into which pins are inserted to position the members at the time of assembly are formed at two positions of the corners of the members included in the head main body 220. The head main body 220 can be integrally assembled by inserting the pins into the pin insertion holes 234 and relatively positioning the members, and joining the members to each other.

As shown in FIG. 2, the head main bodies 220 retained in the supply member 30 with the head cases 230 interposed therebetween are relatively positioned and retained by the cover head 240 with a box-like shape so that the liquid ejection surfaces of the five head main bodies 220 are covered.

The cover head 240 includes exposure openings 241 exposing the nozzle openings 71 and a head joining portion 242 partitioning the exposure openings 241 and joined to both ends of the arranged nozzle openings 71 of at least the nozzle rows 71A on the liquid ejection surfaces of the head main bodies 220.

In this embodiment, the head joining portion 242 includes a frame 243 disposed along the outer circumference of the liquid ejection surface across the plurality of head main bodies 220 and a beam portion 244 extending between the adjacent head main bodies 220 and dividing the exposure openings 241. The frame 243 and the beam portion 244 are joined to the liquid ejection surface of the head main bodies 220, that is, the surfaces of the nozzle plates 70.

In the cover head 240, a sidewall portion 245 is disposed on the side of the liquid ejection surfaces of the head main bodies 220 so as to extend and be bent across the outer circumferences of the liquid ejection surfaces.

Since the head joining portion 242 of the cover head 240 seems to be adhered to the liquid ejection surfaces of the head main bodies 220, a step difference between the liquid ejection surfaces and the cover head 240 can be decreased. Therefore, even when a wiping or suction operation is executed on the liquid ejection surfaces, the ink can be prevented from remaining on the liquid ejection surfaces. Since the spaces between the adjacent head main bodies 220 are blocked by the beam portion 244, the ink does not leak into the spaces between the adjacent head main bodies 220. Moreover, the piezoelectric element 300 or the driving circuit 110 can be prevented from deteriorating or being broken due to the ink. Since the spaces between the liquid ejection surfaces of the head main bodies 220 and the cover head 240 are adhered by an adhesive without a gap, the printing medium S is prevented from inserting into a gap. Therefore, the cover head 240 is prevented from being deformed and a paper sheet is prevented from being jammed. Since the sidewall portion 245 covers the outer circumferences of the plurality of head main bodies 220, the ink can be reliably prevented from circling and being inserted on the side surfaces of the head main bodies 220. Moreover, since the head joining portion 242 joined to the liquid ejection surfaces of the head main bodies 220 are formed in the cover head 240, the nozzle rows 71A of the plurality of head main bodies 220 can be positioned and joined to the head cover 240 at high precision.

The cover head 240 is formed of a metal material such as stainless steel. The metal plate may be formed by press working or casting. By forming the cover head 240 of a conductive metal material, the cover head 240 may be grounded. A material used to join the cover head 240 and the nozzle plate 70 is not particularly limited. For example, a thermosetting epoxy-based adhesive or an ultraviolet cure adhesive may be used for the adhesion.

The printing head 11 according to this embodiment ejects ink droplets from the nozzle openings 71 by acquiring the ink from the ink cartridge 13 via the liquid supply passage 90 (the first liquid supply passage 91 and the second liquid supply passage 92), filling the inside from the manifold 100 to the nozzle opening 71 with the ink via the ink supply communication passage 231 and the ink introducing port 144, applying a voltage to each piezoelectric element 300 corresponding to each pressure generating chamber 62 in accordance with a print signal from the driving circuit 110, and deforming the elastic film 50 and the piezoelectric element 300 in a bending manner to increase the pressure of each pressure generating chamber 62.

Hereinafter, a method of manufacturing the printing head 11 and particularly the supply member 30 will be described in detail. FIGS. 8A and 8B to FIG. 10 are sectional views illustrating a method of manufacturing the ink jet printing head according to the first embodiment of the invention.

Figure 8A:
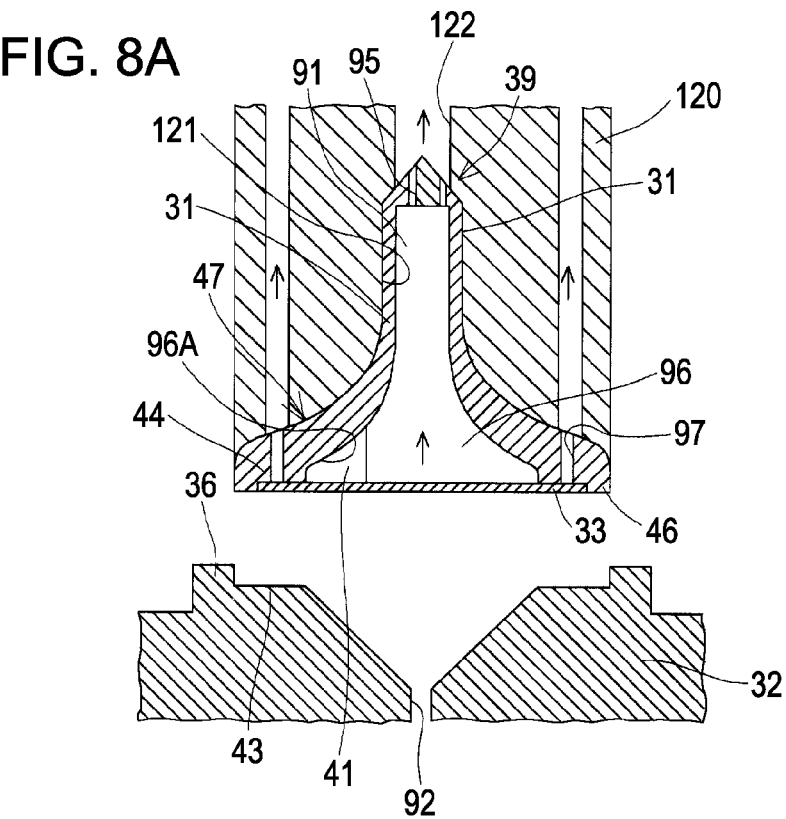
FIGS. 8A and 8B are sectional views illustrating a method of manufacturing the printing head according to the first embodiment of the invention.

First, as shown in FIG. 8A, the filter 33 is sucked, adsorbed, and positioned to the needle-side filter nip portion 44, which is the end surface of the supply needle 31 on the side of the supply member main body 32 (where a disposing process is included). The filter 33 is sucked using the first liquid supply passage 91 and the through-holes 97 of the supply needle 31. That is, in this embodiment, the first liquid supply passage 91 and the through-holes 97 of the supple needle 31 serve as sucking holes. A retention jig 120 shown in FIG. 8A is used to use the first liquid supply passage 91 and the through-holes 97 as the sucking holes.

The retention jig 120 has a concave portion 121 having nearly the same as the outer shape of the supply needle 31. The retention jig 120 also has a suction communication hole 122 communicating with the ink introducing port 95 and the through-holes 97 of the supply needle 31. A sucking pump (not shown) such as a vacuum pump is disposed on the opposite side of the supply needle 31 of the suction communication hole 122. Therefore, by adsorbing the filter 33 via the suction communication hole 122, the ink introducing port 95 (the first liquid supply passage 91), and the through-holes 97 by the sucking pump, the filter 33 is adsorbed to the supply needle 31.

At this time, by sucking the filter 33 via not only the first liquid supply passage 91 but also the through-holes 97, only the middle portion of the filter 33 can be prevented from being deformed in a convex shape toward the first liquid supply passage 91. That is, when the filter 33 is sucked only via the first liquid supply passage 91 (the ink introducing port 95), as in FIG. 9, only the middle portion of the filter 33 is deformed in a convex shape and protrudes in the first liquid supply passage 91 due to the fact that the circumference of the filter 33 is regulated by the needle-side filter nip portion 44. In this embodiment, however, by sucking the circumference of the filter 33 through the through-holes 97 and adsorbing the filter 33 to the needle-side filter nip portion 44, the filter 33 rises to the needle-side filter nip portion 44 by a predetermined tensile force. Therefore, even when the middle portion of the filter 33 is sucked, the middle portion of the filter 33 can be prevented from being deformed and protruding toward the ink introducing port 95.

The first supporting protrusions 41 are formed in the supply needle 31. The deformation of the filter 33 is also regulated by the first supporting protrusions 41. That is, when the first supporting protrusions 41 are formed, the middle portion of the filter 33 is prevented from being deformed in the convex shape protruding toward the ink introducing port 95. Therefore, the through-holes 97 sucking the circumference of the filter 33 may be not provided. Of course, by sucking the filter 33 via the through-holes 97 and also providing the first supporting protrusions 41, it is possible to more reliably prevent the filter 33 from being deformed.

In this embodiment, the first liquid supply passage 91 and the through-holes 97 are used as the sucking holes. However, the invention is not limited thereto. For example, only the through-holes 97 may be used as the sucking holes. That is, only the circumference of the filter 33 may be sucked only via the through-holes 97 and may be adsorbed to the supply needle 31.

Figure 8B:
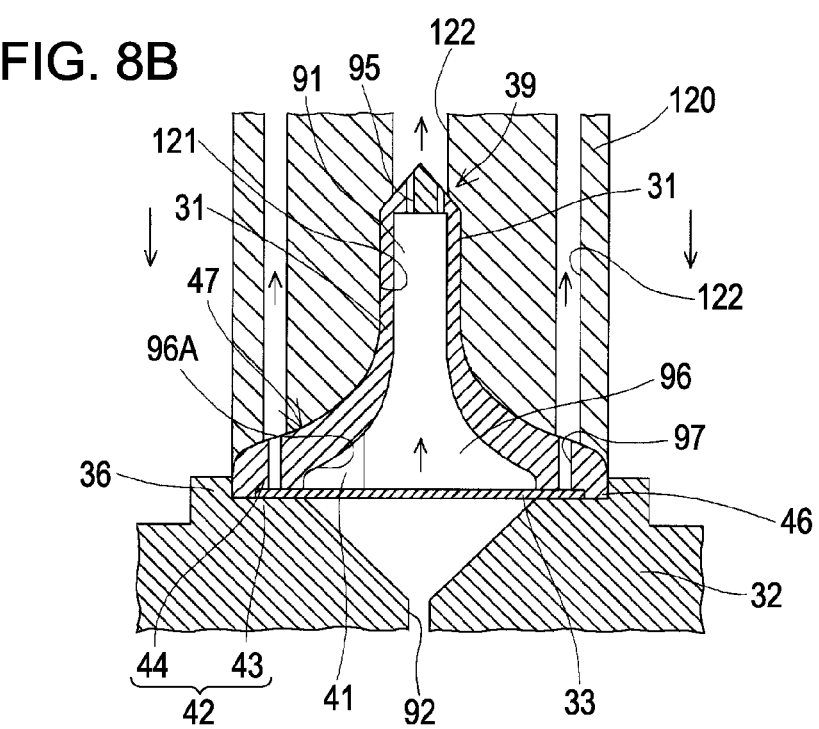
Figure 9:
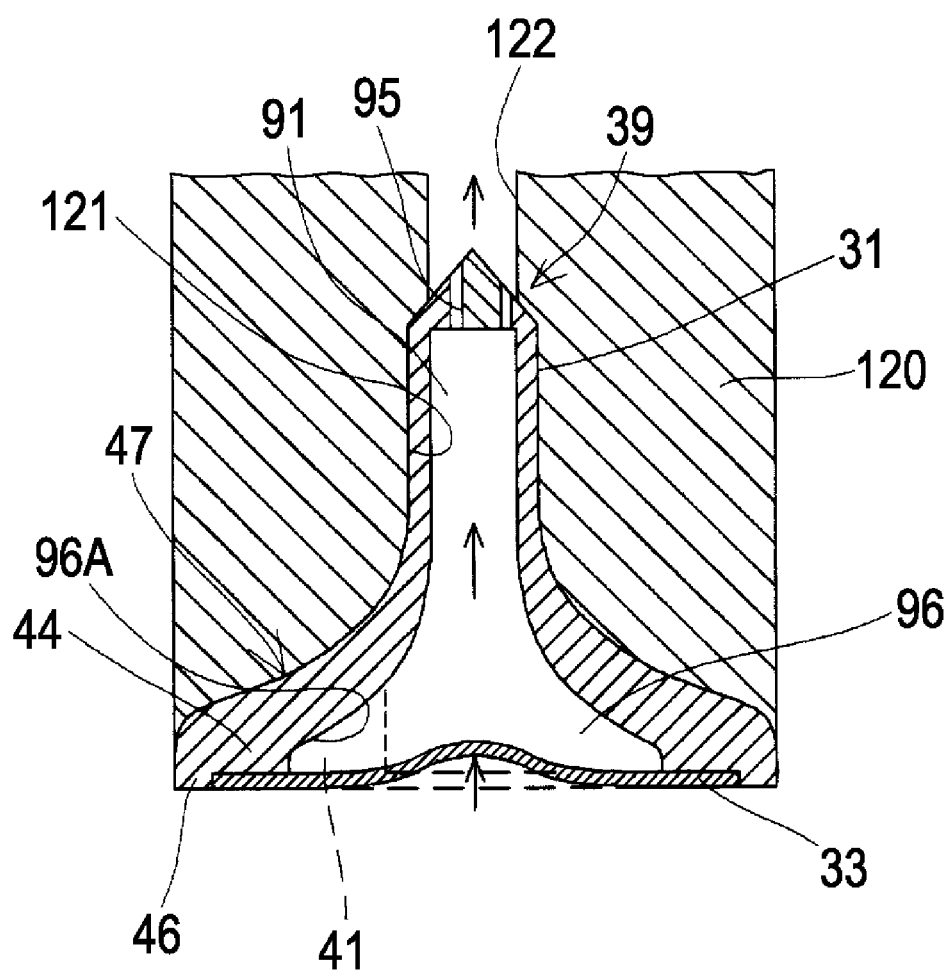
FIG. 9 is a sectional view illustrating the method of manufacturing the printing head according to the first embodiment of the invention.

Next, as shown in FIG. 8B, the filter 33 is nipped by the supply needle 31 and the supply member main body 32 sucking and adsorbing the filter 33 (a positioning process). At this time, since the filter 33 is sucked and adsorbed to the supply needle 31, the filter 33 can be prevented from being deviated in its position or being deformed due to the impact or friction when the supply needle 31 and the supply member main body 32 come into contact with each other with the filter 33 nipped therebetween. Moreover, since the filter 33 is sucked and adsorbed to the supply needle 31, the filter 33 can be prevented from falling down even when the supply needle 31 and the supply member main body 32 come into contact with each other in a direction in which the surface of the filter 33 is oriented in a vertical direction. Therefore, since the limitation on the direction of a mold is not put in the subsequent process, the manufacturing efficiency can be improved.

Figure 10:
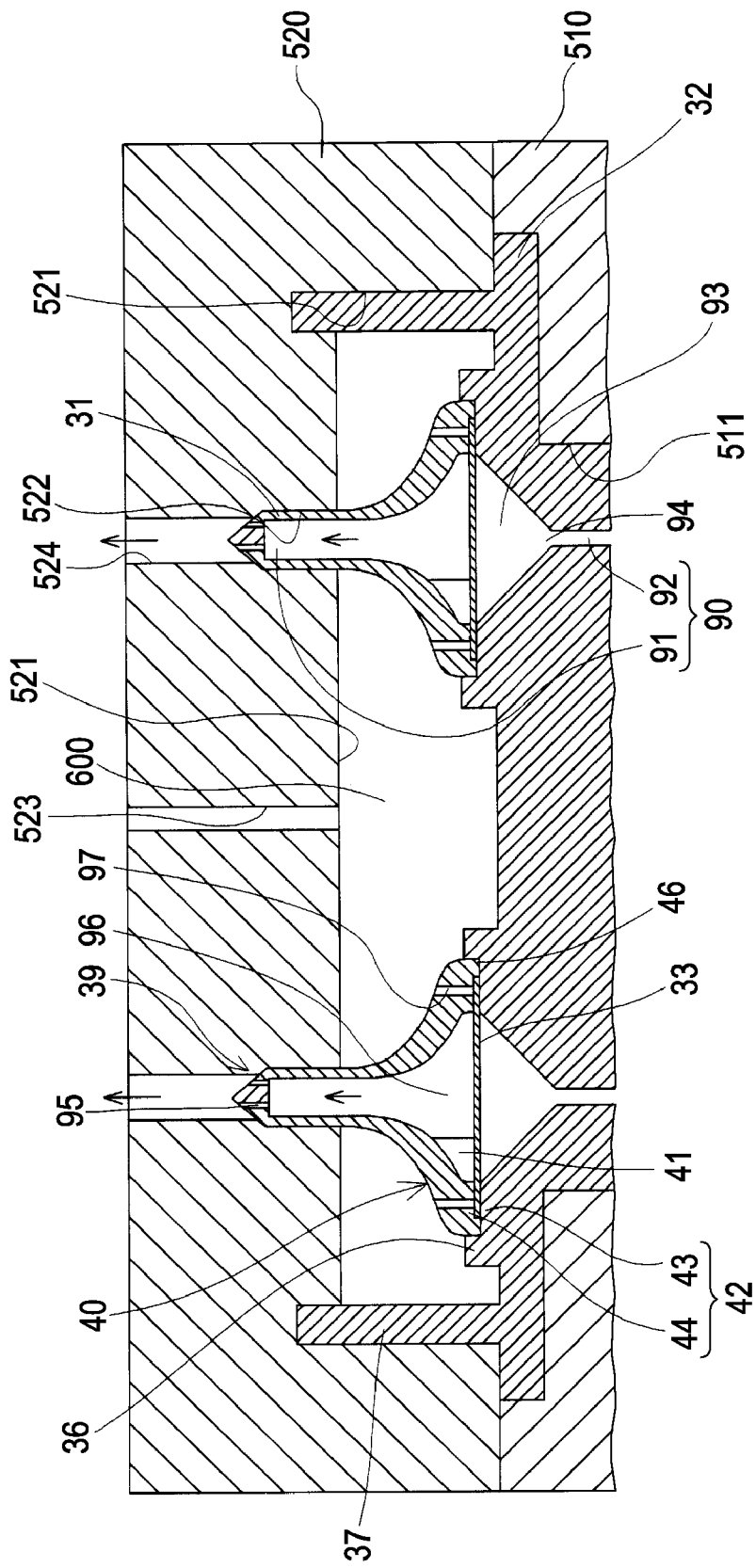
FIG. 10 is a sectional view illustrating the method of manufacturing the printing head according to the first embodiment of the invention.

Next, as shown in FIG. 10, the supply needles 31 and the supply member main body 32 nipping the filter 33 are retained by a first mold 510 and a second mold 520, which are an example of the mold.

The first mold 510 and the second mold 520 interpose the supply needles 31 and the supply member main body 32 nipping the filter 33 and have a space 600 where the integrally molded member 34 (see FIG. 4) is formed by injecting resin. Specifically, the first mold 510 has a first concave portion 511 into which the supply member main body 32 is fitted. The second mold 520 has second concave portions 521 forming a part of the space 600 and needle retaining holes 522 into which the front end portions 39 of the supply needles 31. Moreover, the second mold 520 has a resin injection hole 523. One end of the resin injection hole 523 communicates with the second concave portion 521. Resin is injected from the other end of the resin injection hole 523.

The second mold 520 has mold suction holes 524 communicating with the first liquid supply passages 91 of the supply needles 31. The mold suction hole 524 is used to suck and adsorb the filter 33 to the supply needle 31 by sucking the filter 33 via the mold suction hole 524 and the first liquid supply passage 91 when the integrally molded member 34 is formed by injecting the resin into the space 600.

The integrally molded member 34 is formed by injecting the heated resin into the space 600 and by cooling and hardening the resin while sucking and adsorbing the filter 33 to the supply needle 31 via the mold suction hole 524 an the first liquid supply passage 91 (see FIG. 4). In this way, it is possible to form the supply member 30 in which the supply needles 31, the supply member main body 32, and the filters 33 are integrally formed in the integrally molded member 34.

In this embodiment, a pressure difference is caused so that the pressure of the first filter chamber 96 is lower than that of the second filter chamber 93 between the first filter chamber 96 (the first liquid supply passage 91) and the second filter chamber 93 (the second liquid supply passage 92) on both sides of the filter 33 by sucking the filter 33 from the first liquid supply passage 91 of the supply needle 31 in which the first supporting protrusions 41 are disposed. Therefore, the integrally molded member 34 is formed in the state (the sucked and adsorbed state) where the filter 33 is firmly pressed toward the first filter chamber 96, that is, the supply needle 31.

When the integrally molded member 34 is formed, the gas in the space 600 is sucked and discharged to the outside via the first liquid supply passages 91 and the mold suction holes 524. Therefore, every corner of the space 600 is filled sufficiently with the heated resin.

When the integrally molded member 34 is formed, the filters 33 are sucked and adsorbed to the supply needles 31. Therefore, even when a filling pressure is applied upon filling the space 600 with the resin or a pressure is applied due to the contraction upon hardening the resin, the filter 33 can be prevented from being deformed. Specifically, in this embodiment, since the sucking is executed from the first liquid supply passages 91, the filter 33 can be prevented from being deformed in the convex shape toward the supply member main body 32. Moreover, when the filter 33 is deformed in the convex shape toward the supply member main body 32, no sufficient space may be formed between the filter 33 and the inner wall of the second filter chamber 93 of the second liquid supply passage 92 and bubbles may gather between the protrusion region of the filter 33 and the inner wall. Therefore, a problem may arise in that the effective area of the filter 33 is decreased.

In this embodiment, however, since the first supporting protrusions 41 are formed in the supply needle 31 and the sucking is executed from the first liquid supply passage 91 of the supply needle 31, the deformation of the filter 33 sucked and adsorbed to the supply needle 31 is regulated by the first supporting protrusions 41. Therefore, the filter 33 is suppressed from being deformed in the convex shape toward the supply needle 31, and thus the surface between the supply needle 31 and the supply member main body 32 is kept flat.

In this embodiment, when the integrally molded member 34 is formed by providing the supply needles 31 with the first supporting protrusions 41, the sucking is executed from the first liquid supply passages 91 of the supple needs 31. However, the invention is not limited thereto. For example, the sucking is executed from the second liquid supply passages 92 of the supply member main body 32. Therefore, advantages can be obtained, since the space 600 can sufficiently be filled with the heated resin and the filter 33 can be prevented from being deformed in the convex shape toward the supply needle 31.

According to this embodiment, the printing head 11 shown in FIG. 2 is formed by fixing the plurality of head main bodies 220 to the supply member 30 formed in the above-described manner and mounting the cover head 240 so as to cover the plurality of head main bodies 220.

Second Embodiment

Figure 11:
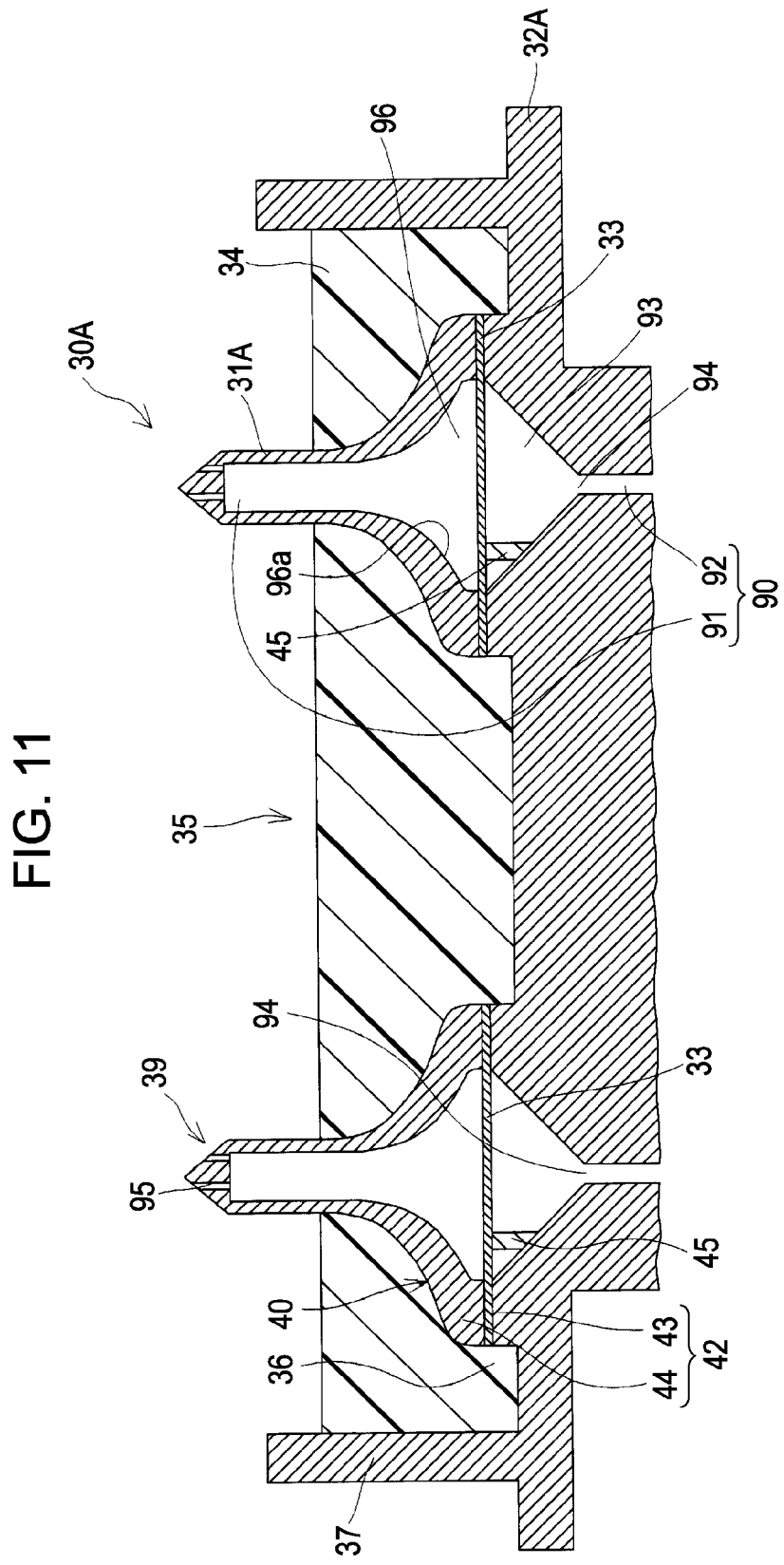
FIG. 11 is a sectional view illustrating a supply member according to a second embodiment of the invention.

FIG. 11 is a sectional view illustrating a supply member according to a second embodiment of the invention. The same reference numbers are given to the same constituent elements as those of the above-described first embodiment, and the repeated description is omitted.

As illustrated in the drawing, a supply member 30A according to the second embodiment includes supply needles 31A as first supply members, a supply member main body 32A as a second supply member having one surface on which the plurality of supply needles 31A are disposed, and filters 33, and an integrally molded member 34.

In the supply needle 31A according to this embodiment, the first supporting protrusion 41 is disposed in a first liquid supply passage 91. In the supply needle 31A, no filter guide 46 is disposed and the needle-side filter nip portion 44 is disposed so as to be flush with the supply member main body 32A.

In the supply member main body 32A, second supporting protrusions 45 protrude toward the filters 33.

The second supporting protrusion 45 has a circular cylindrical shape and is disposed on the inner wall surface of the second filter chamber 93 of the second liquid supply passage 92 of the supply member main body 32A. In this embodiment, three second supporting protrusions 45 are formed in the periphery of the ink supply port 94. The base end portion of each second supporting protrusion 45 is fixed to the inner wall surface of the second filter chamber 93. The front end portion of each second supporting protrusion 45 protrudes toward the filter 33, and thus supports the filter 33.

The second supporting protrusions 45 are disposed in the region where the distance between the inner wall of the supply member main body 32A facing the filter 33 and the filter 33 is the half or less than the distance between the ink supply port 94 and the filter 33. The distance according to this specification refers to the shortest distance. The second supporting protrusions 45 don't come into contact with the nip region 42 where the filter 33 is nipped and a space is formed therebetween so that the ink is not congested and passes.

In this way, by providing the second supporting protrusions 45, the filter 33 can be prevented from being deformed in the convex shape toward the supply member main body 32A.

Figure 12A:
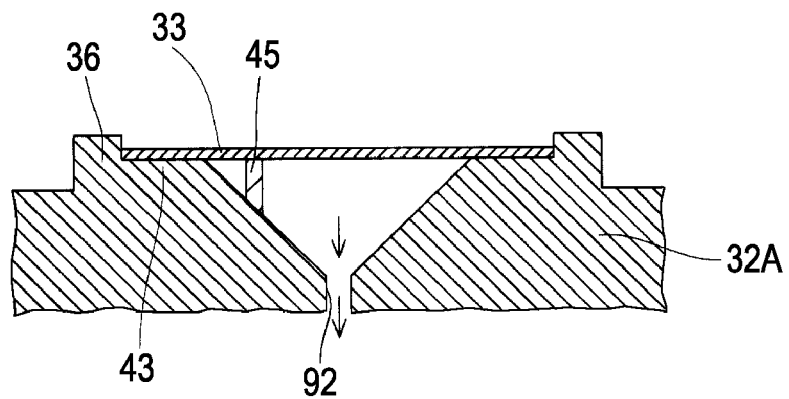
FIGS. 12A and 12B are sectional views illustrating a method of manufacturing a printing head according to the second embodiment of the invention.
Figure 12B:
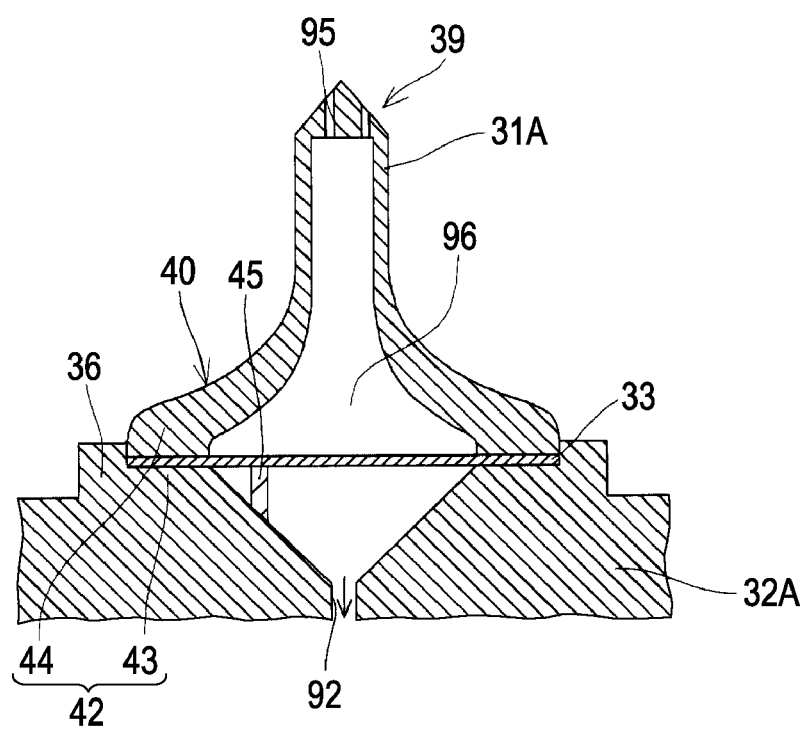
Figure 13:
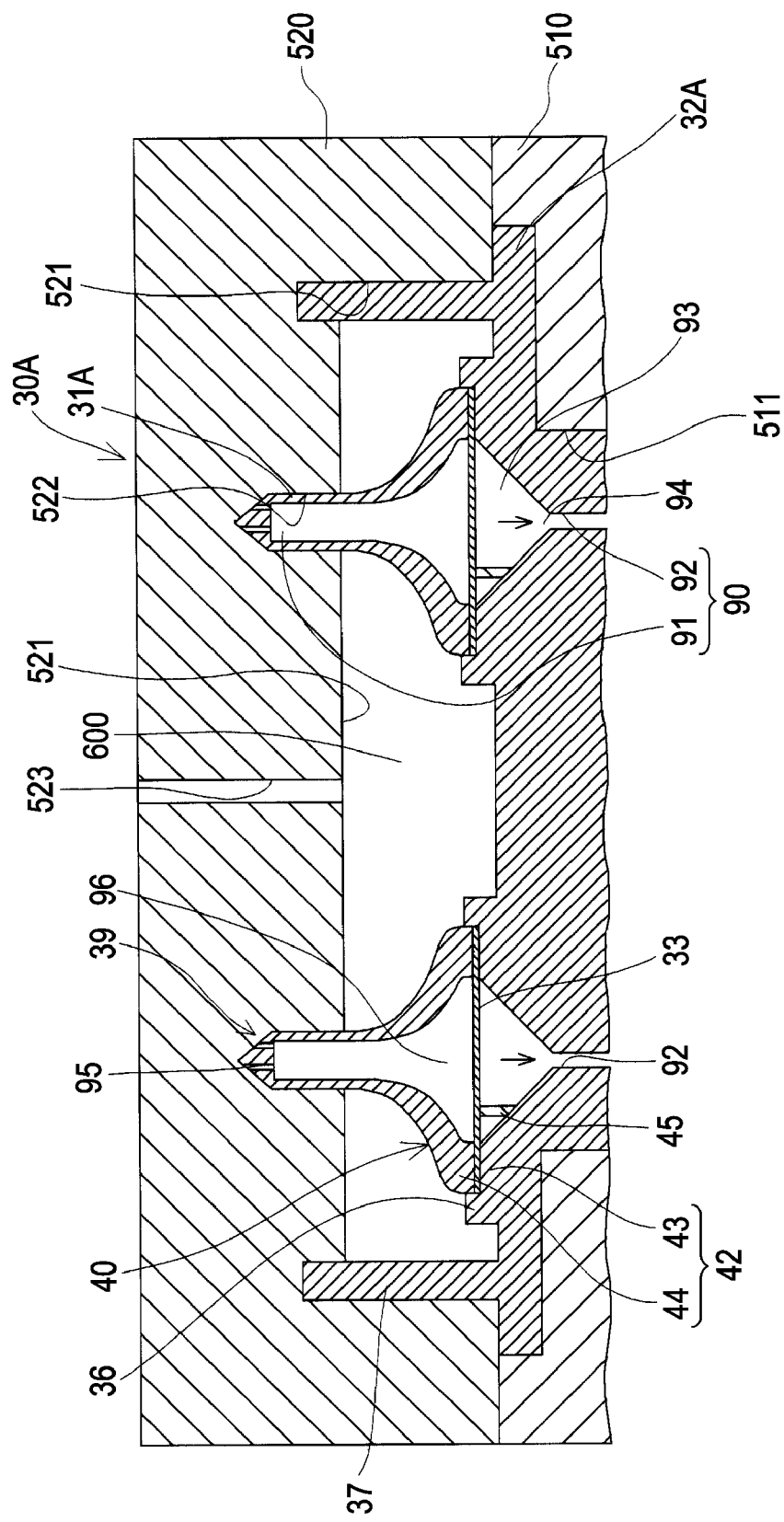
FIG. 13 is a sectional view illustrating the method of manufacturing the printing head according to the second embodiment of the invention.

A method of manufacturing the printing head 11 will be described which includes the supply member 30A according to the second embodiment. FIGS. 12A and 12B and FIG. 13 are sectional views illustrating the method of manufacturing the printing head according to the second embodiment of the invention.

First, as shown in FIG. 12A, the filter 33 is sucked, adsorbed, and positioned to the filter nip portion 43, which is the end surface of the supply needle 31A of the supply member main body 32A (where a disposing process is included). The filter 33 is sucked using the second liquid supply passage 92. That is, in this embodiment, the second liquid supply passages 92 of the supply member main body 32A serve as the suction holes.

When the filter 33 is sucked, the second supporting protrusions 45 are disposed in the supply member main body 32A. Therefore, even when the filter 33 is sucked via the second supply passage 92, the middle portion of the filter 33 can be regulated so as not be deformed in the convex shape toward the supply member main body 32A by the second supporting protrusions 45, and thus the filter 33 can be prevented from being deformed. In this embodiment, only the second liquid supply passage 92 is used as the suction hole. However, the invention is not limited thereto. For example, as in the above-described first embodiment, the through-hole opened to the circumference of the filter 33 may be formed in the supply member main body 32A. Then, the through-hole may be used as the suction hole, or the through-hole and the second liquid supply passage 92 may be used as the suction holes.

Next, as shown in FIG. 12B, the filter 33 is nipped by the supply member main body 32A and the supply needle 31A sucking and adsorbing the filter 33 (a positioning process). At this time, since the filter 33 is sucked and adsorbed to the supply member main body 32A, the filter 33 can be prevented from being deviated in its position or being deformed due to the impact or friction when the supply needle 31A and the supply member main body 32A come into contact with each other with the filter 33 nipped therebetween. Moreover, since the filter 33 is sucked and adsorbed to the supply needle 31A, the filter 33 can be prevented from falling down even when the supply needle 31A and the supply member main body 32A come into contact with each other in a direction in which the surface of the filter 33 is oriented in a vertical direction. Therefore, since the limitation on the direction of a mold is not put in the subsequent process, the manufacturing efficiency can be improved.

Next, as shown in FIG. 13, the supply needles 31A and the supply member main body 32A nipping the filter 33 are retained by a first mold 510 and a second mold 520, which are an example of the mold.

Subsequently, the integrally molded member 34 is formed by injecting the heated resin into the space 600, which is partitioned between the first mold 510 and the second mold 520, and by cooling and hardening the resin while sucking and adsorbing the filter 33 to the supply member main body 32A via the second liquid supply passage 92 (see FIG. 11). In this way, it is possible to form the supply member 30A in which the supply needles 31A, the supply member main body 32A, and the filters 33 are integrally formed in the integrally molded member 34.

In this embodiment, a pressure difference is caused so that the pressure of the second filter chamber 93 is lower than that of the first filter chamber 96 between the first filter chamber 96 (the first liquid supply passage 91) and the second filter chamber 93 (the second liquid supply passage 92) on both sides of the filter 33 by sucking the filter 33 from the second liquid supply passage 92 of the supply member main body 32A in which the second supporting protrusions 45 are disposed. Therefore, the integrally molded member 34 is formed in the state (the sucked and adsorbed state) where the filter 33 is firmly pressed toward the second filter chamber 93, that is, the supply member main body 32A.

When the integrally molded member 34 is formed, the gas in the space 600 is sucked and discharged to the outside via the second liquid supply passages 92. Therefore, every corner of the space 600 is filled sufficiently with the heated resin.

When the integrally molded member 34 is formed, the filters 33 are sucked and adsorbed to the supply member main body 32A. Therefore, even when a filling pressure is applied upon filling the space 600 with the resin or a pressure is applied due to the contraction upon hardening the resin, the filter 33 can be prevented from being deformed. Specifically, in this embodiment, since the sucking is executed from the second liquid supply passages 92, the filter 33 can be prevented from being deformed in the convex shape toward the supply needle 31A. Moreover, when the filter 33 is deformed in the convex shape toward the supply needle 31A, no sufficient space may be formed between the filter 33 and the inner wall of the first filter chamber 96 of the first liquid supply passage 91 and bubbles may gather between the protrusion region of the filter 33 and the inner wall. Therefore, a problem may arise in that the effective area of the filter 33 is decreased.

In this embodiment, however, since the second supporting protrusions 45 are formed in the supply member main body 32A and the sucking is executed from the second liquid supply passages 92 of the supply member main body 32A, the deformation of the filter 33 sucked and adsorbed to the supply member main body 32A is regulated to the supply member main body 32A by the second supporting protrusions 45. Therefore, the filter 33 is suppressed from being deformed in the convex shape toward the supply member main body 32A, and thus the surface between the supply needle 31A and the supply member main body 32A is kept flat.

Third Embodiment

Figure 14:
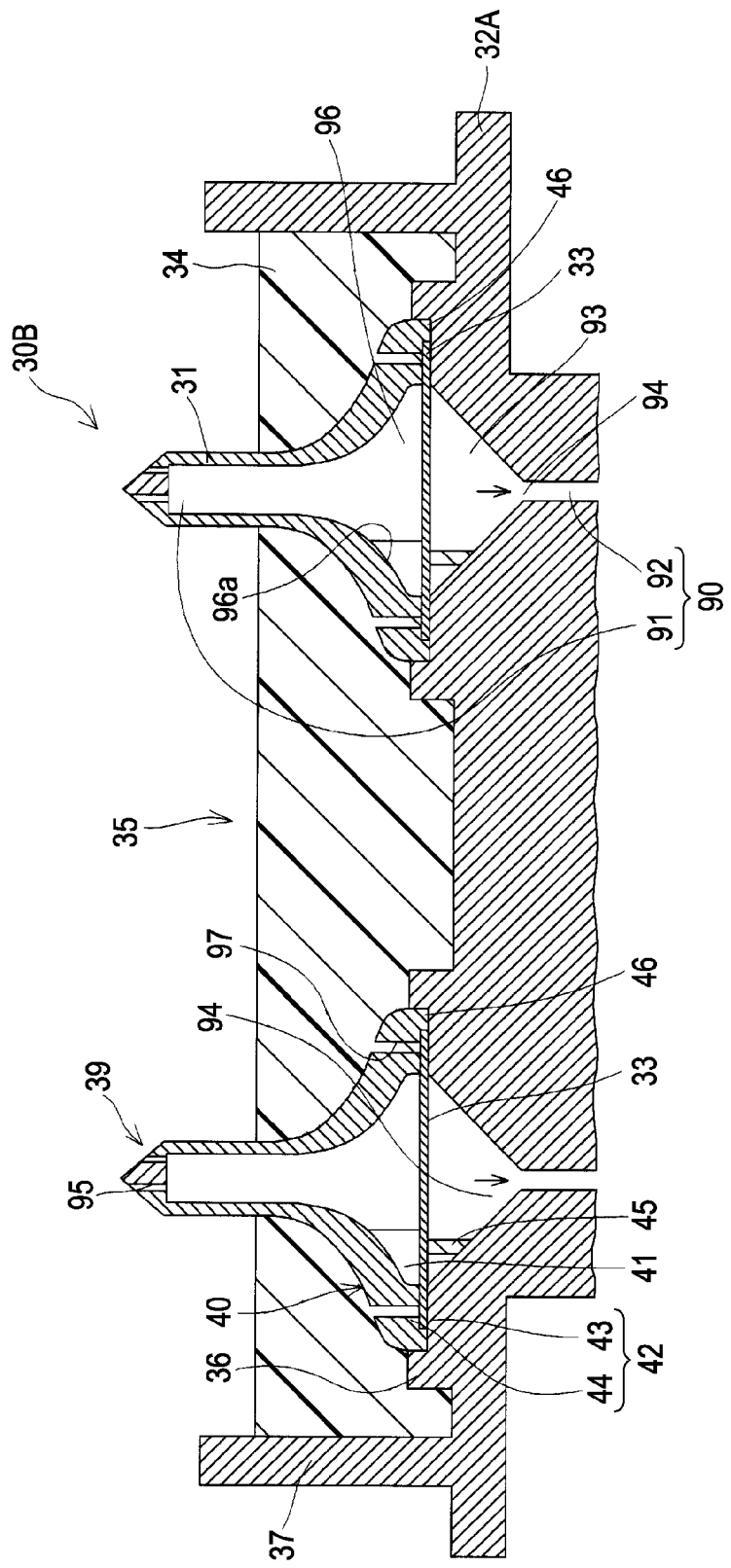
FIG. 14 is a sectional view illustrating a supply member according to a third embodiment of the invention.

FIG. 14 is a sectional view illustrating a supply member according to a third embodiment of the invention. The same reference numbers are given to the same constituent elements as those of the above-described embodiments, and the repeated description is omitted.

As shown in FIG. 14, a supply member 30B according to the third embodiment includes supply needles 31 as first supply members, a supply member main body 32A as a second supply member, and filters 33, and an integrally molded member 34.

The supply needle 31 has the same member as that of the above-described first embodiment, that is, the first supporting protrusion 41.

The supply member main body 32A has the same member as that of the above-described second embodiment, that is, the second supporting protrusion 45.

The filter 33 is nipped between the first supporting protrusion 41 of the supply needle 31 and the second supporting protrusion 45 of the supply member main body 32A. In this embodiment, the first supporting protrusion 41 of the supply needle 31 and the second supporting protrusion 45 of the supply member main body 32A are disposed at the positions at which the filter 33 can be nipped by the front end portions thereof. Of course, the first supporting protrusion 41 and the second supporting protrusion 45 may be disposed at different positions which do not face each other.

With such a configuration, before a mold is disposed, the filter 33 may be sucked and adsorbed to the supply needle 31 or the filter 33 may be sucked and adsorbed to the supply member main body 32A.

Figure 15:
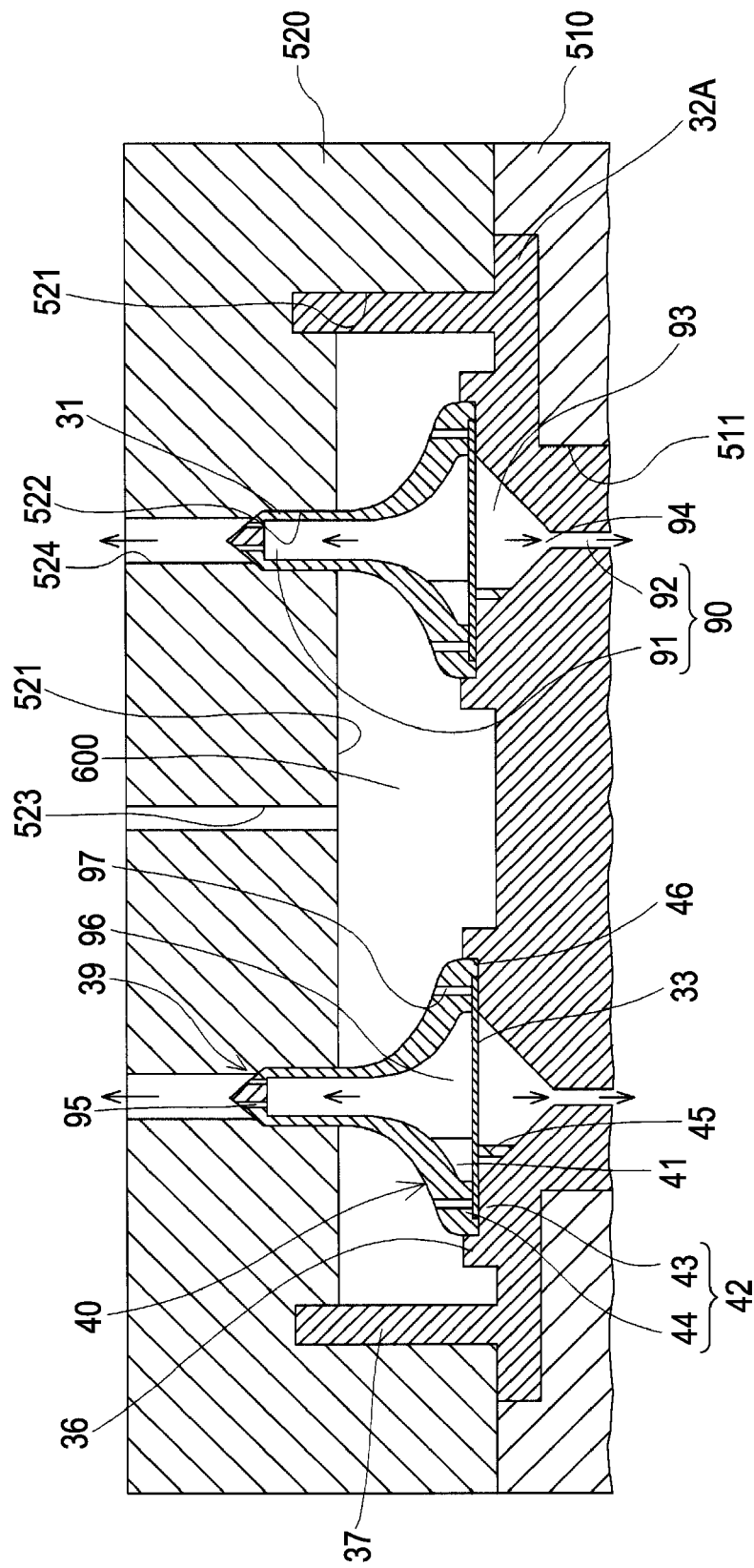
FIG. 15 is a sectional view illustrating a method of manufacturing a printing head according to the third embodiment of the invention.

When the integrally molded member 34 is formed, the sucking may be executed from the supply needle 31 (the first liquid supply passage 91) as in the above-described first embodiment or may be executed from the supply member main body 32A (the second liquid supply passage 92) as in the above-described second embodiment. When the integrally molded member 34 is formed, as in FIG. 15, the sucking may be executed from both of the supply needle 31 (the first liquid supply passage 91) and the supply member main body 32A (the second liquid supply passage 92). Even when no pressure difference is caused on the both upon executing the sucking from the both sides of the filter 33, the filter 33 is prevented from being deformed by the first supporting protrusion 41 and the second supporting protrusion 45.

Other Embodiments

The embodiments of the invention have been described, but the basic configuration according to the invention is not limited to the above-described configurations. For example, in the above-described first to third embodiments, the pressure difference is caused between the first filter chamber 96 and the second filter chamber 93 on both sides of the filter 33 by executing the sucking from the first liquid supply passage 91 or the second liquid supply passage 92. However, the invention is not limited thereto. The pressure difference may be caused between the first filter chamber 96 and the second filter chamber 93 on both sides of the filter 33 by blowing a gas from the first liquid supply passage 91 or the second liquid supply passage 92. Specifically, in the first embodiment, a gas may be blown from the second liquid supply passage 92 of the supply member main body 32 in which the first supporting protrusions 41 are not disposed. In the second embodiment, similarly, a gas may be blown from the first liquid supply passage 91 of the supply needle 31A in which the second supporting protrusion 45 is not disposed. Of course, the blowing of a gas or the sucking may be simultaneously executed.

In the above-described first to third embodiments, the ink supply port 94 of the supply member main body 32 and 32A is formed in the middle portion of the second filter chamber 93. However, the invention is not limited thereto. The ink supply port 94 may be opened at a position eccentric in one direction in the second filter chamber 93.

In the above-described first to third embodiments, the supply needles 31 and 31A serve as the first supply members and the supply member main bodies 32 and 32A serve as the second supply member. However, other members may serve as the first and second supply members.

In the above-described first to third embodiments, one head main body 220 is disposed for two liquid supply passages 90. However, the plurality of head main bodies may be provided for every ink color. In this case, the liquid supply passages communicate with the head main bodies, respectively. That is, each liquid supply passage may communicate with each nozzle row in which the nozzle openings formed in each head main body are arranged in parallel. Of course, the liquid supply passage may not communicate with each nozzle row. One liquid supply passage may communicate with the plurality of nozzle rows. Alternatively, one nozzle row may be divided into two groups and the liquid supply passages may communicate with the two groups, respectively. That is, the liquid supply passage may communicate with a nozzle opening group formed by the plurality of nozzle openings.

In the above-described embodiments, the ink jet printing head 11 ejecting the ink droplets have been used to describe the invention, but the invention is applicable to all kinds of liquid ejecting heads. Examples of the liquid ejecting head include a printing head used in an image printing apparatus such as a printer, a color material ejecting head used to manufacture a color filter such as a liquid display, an electrode material ejecting head used to form electrodes such as an organic EL display and an FED (Field Emission Display), and a bio organism ejecting head used to manufacture a bio chip.

What is claimed is:

1. A method of manufacturing a liquid ejecting head which includes a head main body having nozzles ejecting a liquid supplied via a liquid supply passage, a first supply member having a first liquid supply passage forming a part of the liquid supply passage, a second supply member disposed on a downstream side of the first supply member and having a second liquid supply passage communicating with the first liquid supply passage and forming a part of the liquid supply passage, a filter disposed between the first and second supply members so as to cross the liquid supply passage, and an integrally molded member fixing the first and second supply members by a resin in a state where the filter is nipped between the first and second supply members, the method comprising:

forming a supporting protrusion protruding toward the filter and supporting the filter on an inner wall surface of at least one of the first and second supply members; and forming the integrally molded member in the state where the filter is nipped between the first and second supply members and a pressure difference is caused between the first and second liquid supply passages on both sides of the filter so that a pressure is lower on the side of the supporting protrusion.

2. The method according to claim 1, wherein the pressure difference is caused between the first and second liquid supply passages by suction from the liquid supply passage on one side of the first and second supply members in which the supporting protrusion is formed or blowing from the liquid supply passage on the other side thereof.

3. The method according to claim 1, wherein a front end surface of the supporting protrusion supporting the filter is rectangular, and a plurality of the supporting protrusions are formed in at least one of the first and second supply members so that a long side of the front end surface of each supporting protrusion has an angle of 180 degrees or less.

4. The method according to claim 1, wherein the supporting protrusion is formed in the first supply member.

* * * * *